US010025776B1

(12) United States Patent
Sjoberg et al.

(10) Patent No.: US 10,025,776 B1
(45) Date of Patent: Jul. 17, 2018

(54) LANGUAGE TRANSLATION MEDIATION SYSTEM

(71) Applicant: Amazon Technologies, Inc., Reno, NV (US)

(72) Inventors: Robert Warren Sjoberg, San Francisco, CA (US); Deon Poncini, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 627 days.

(21) Appl. No.: 13/861,755

(22) Filed: Apr. 12, 2013

(51) Int. Cl.
*G06F 17/20* (2006.01)
*G06F 17/27* (2006.01)
*G06F 17/28* (2006.01)

(52) U.S. Cl.
CPC .................................. *G06F 17/28* (2013.01)

(58) Field of Classification Search
CPC ............... G06F 17/289; G06F 17/2836; G06F 17/2854; G06F 17/3043
USPC ........................................................ 704/1–9
See application file for complete search history.

(56) References Cited

U.S. PATENT DOCUMENTS

| | | | | |
|---|---|---|---|---|
| 5,408,410 A * | 4/1995 | Kaji | ..................... | G06F 17/271 704/2 |
| 7,197,459 B1 | 3/2007 | Harinarayan et al. | | |
| 7,801,756 B1 | 9/2010 | Harinarayan et al. | | |
| 8,380,486 B2 * | 2/2013 | Soricut | ................ | G06F 17/289 704/2 |
| 8,442,856 B2 * | 5/2013 | Hanahara | ............ | G06F 17/2836 705/7.35 |
| 8,666,724 B2 * | 3/2014 | Yoshimura | ............. | G06Q 10/10 704/2 |
| 8,886,517 B2 * | 11/2014 | Soricut | ............... | G06F 17/2854 704/2 |
| 8,983,825 B2 * | 3/2015 | Sarr | ...................... | G06F 17/289 704/10 |

(Continued)

OTHER PUBLICATIONS

Fuchun Peng, Chinese Segmentation and New Word Detection using Conditional Random Fields, University of Massachusetts—Amherst Scholar Works @ UMass Amherst, 2004, pp. 1-8, Computer Science Department Faculty Publication Series. Paper 92.

(Continued)

*Primary Examiner* — Olujimi Adesanya
(74) *Attorney, Agent, or Firm* — Knobbe, Martens, Olson & Bear, LLP

(57) ABSTRACT

Systems and methods for an online mediated language translation market are described. A language translation mediation ("LTM") system may provide customers with the ability to request and receive language translation services on demand and/or in real-time. Language translation services may be provided by the language translation mediation system, for example via translators who know multiple languages, in exchange for a translation fee. A customer may request a translation of text, images, audio and/or video content from the LTM system, the LTM system routes the translation request to one or more translators who may perform the translation, and the LTM system provides one or more selected translations to the customer. In some embodiments the LTM system may determine a price for a translation and/or facilitate payment on behalf of, or from, the customer, to the translator who provided the translation for the customer.

24 Claims, 8 Drawing Sheets

(56) References Cited

U.S. PATENT DOCUMENTS

| | | | | |
|---|---|---|---|---|
| 9,280,753 B2 * | 3/2016 | Wilson | | G06Q 10/06 |
| 2003/0176995 A1 * | 9/2003 | Sukehiro | | G06F 17/289 |
| | | | | 704/2 |
| 2005/0010419 A1 * | 1/2005 | Pourhamid | | G06Q 30/02 |
| | | | | 704/277 |
| 2005/0246156 A1 * | 11/2005 | Scanlan | | G06F 17/289 |
| | | | | 704/2 |
| 2006/0080079 A1 * | 4/2006 | Yamabana | | G06F 17/289 |
| | | | | 704/2 |
| 2006/0116865 A1 * | 6/2006 | Cheng | | G06F 17/289 |
| | | | | 704/2 |
| 2006/0271352 A1 * | 11/2006 | Nikitin | | G06F 17/289 |
| | | | | 704/9 |
| 2007/0294076 A1 * | 12/2007 | Shore | | G06F 17/2836 |
| | | | | 704/2 |
| 2008/0172219 A1 * | 7/2008 | Thomas | | G06F 17/289 |
| | | | | 704/8 |
| 2009/0198487 A1 * | 8/2009 | Wong | | G06F 17/28 |
| | | | | 704/4 |
| 2009/0204389 A1 * | 8/2009 | Wang | | G06F 17/289 |
| | | | | 704/7 |
| 2009/0265175 A1 * | 10/2009 | Fang | | G06F 17/289 |
| | | | | 704/277 |
| 2011/0077934 A1 * | 3/2011 | Kanevsky | | G06F 17/289 |
| | | | | 704/3 |
| 2011/0077935 A1 * | 3/2011 | Viswanadha | | G06F 17/30899 |
| | | | | 704/7 |
| 2011/0282647 A1 * | 11/2011 | Pastore | | G06F 17/289 |
| | | | | 704/4 |
| 2012/0141959 A1 * | 6/2012 | von Ahn Arellano | | G09B 19/06 |
| | | | | 434/157 |
| 2012/0221319 A1 * | 8/2012 | Trese | | G06F 17/28 |
| | | | | 704/2 |
| 2012/0240039 A1 * | 9/2012 | Walker | | G06Q 10/10 |
| | | | | 715/265 |
| 2012/0265518 A1 * | 10/2012 | Lauder | | G06F 17/2854 |
| | | | | 704/3 |
| 2012/0316861 A1 * | 12/2012 | Custer | | G06F 17/289 |
| | | | | 704/2 |
| 2013/0124185 A1 * | 5/2013 | Sarr | | G06F 17/289 |
| | | | | 704/2 |
| 2013/0332143 A1 * | 12/2013 | Leszczenski | | G06F 17/2836 |
| | | | | 704/2 |
| 2014/0058718 A1 * | 2/2014 | Kunchukuttan | | G06F 17/2836 |
| | | | | 704/2 |
| 2014/0114642 A1 * | 4/2014 | van den Oever | | G06F 17/2818 |
| | | | | 704/2 |
| 2014/0188453 A1 * | 7/2014 | Marcu | | G06F 17/289 |
| | | | | 704/2 |
| 2014/0236566 A1 * | 8/2014 | Schreier | | G06Q 10/105 |
| | | | | 704/2 |

OTHER PUBLICATIONS

Scott Novotney and Christ Callison-Burch, Automatic Speech Recognition with Non-Expert Transcription, Ceneter for Language and Speech Processing, Johns Hopkins University, Jun. 2010, pp. 1-9.
Google Translate Home Page, http://translate.google.com, last accessed Apr. 12, 2013, pp. 1.
Inside Google Translate, http://translate.google.com/about/intl/en_ALL/, last accessed Apr. 12, 2013, pp. 1-4.

* cited by examiner

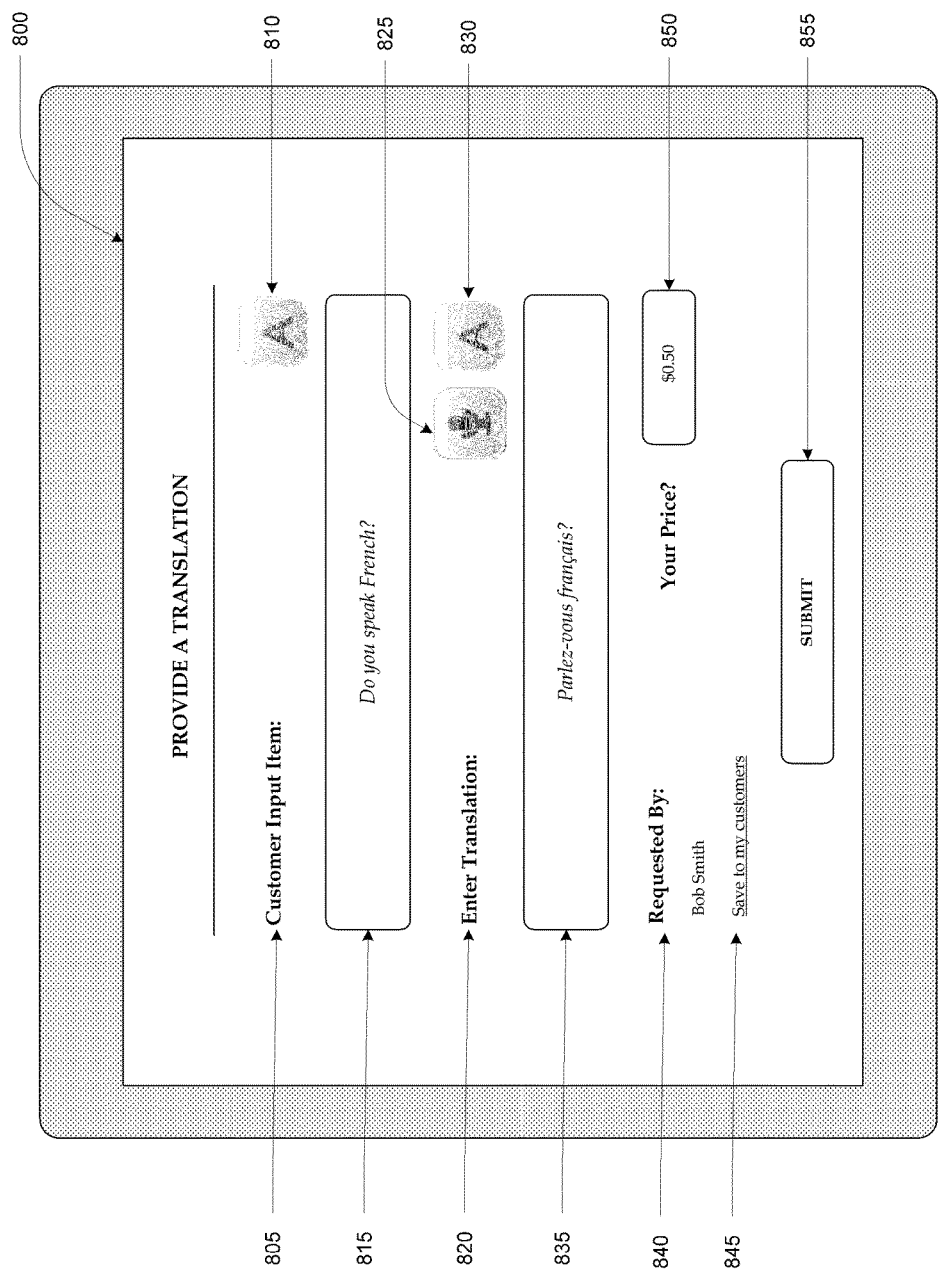

LANGUAGE TRANSLATION MEDIATION SYSTEM

BACKGROUND

Increased globalization has led to an increased demand for language translation. The growth of the Internet and other technologies has blurred the traditional social, cultural and economic boundaries, the need for individuals to communicate effectively and efficiently across international lines is greater than ever before. Machine translation technologies have been developed and advanced to help satisfy this demand, but machine-based translations are often inaccurate and erroneous due to the complex nature of human linguistics.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 8 illustrates an example user interface 800 which presents a translator with a translation request and allows the translator to submit a translation involving a language translation mediation system, such as the language translation mediation system of FIG. 1

DETAILED DESCRIPTION

Overview

Figure 1:
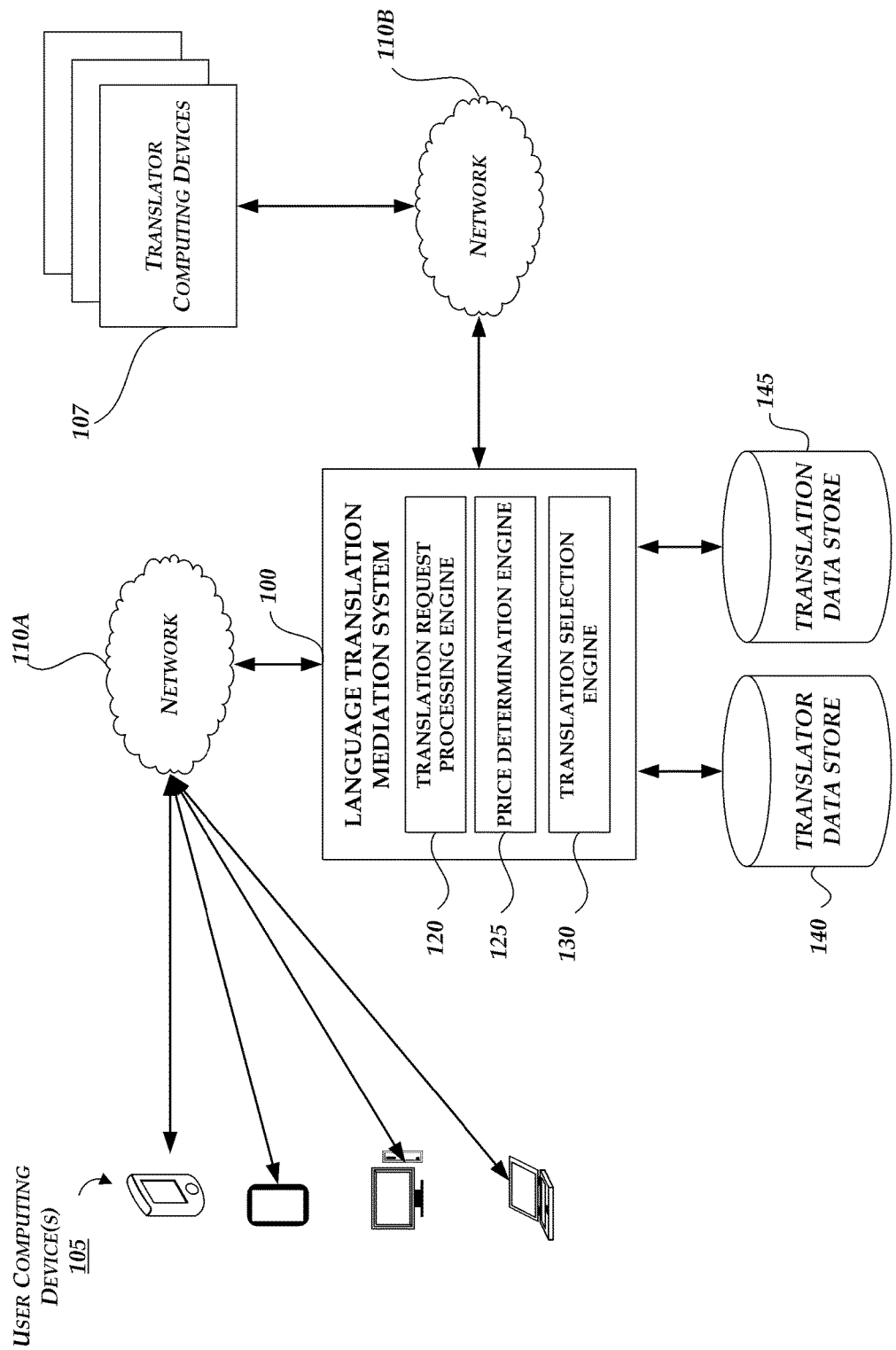
FIG. 1 illustrates a general architecture of a language translation mediation system according to one embodiment.

Human translation provided by individuals who speak and understand multiple languages remains a preferred means of acquiring accurate translations. However, human translation services are often a costly or inefficient alternative to machine-based translations, which has limited their widespread use. This disclosure describes embodiments of a system and methods for an online mediated language translation market. A language translation mediation ("LTM") system may provide customers or users with the ability to request and receive language translation services in real-time. Language translation services may be provided by the language translation mediation system, for example via individual translators who know multiple languages. These translators may provide translation services to customers, as mediated by the LTM system, in exchange for a translation fee. Translations may be provided on-demand or in "real-time," such that a customer may request a translation from the LTM system, the LTM system routes the translation request to one or more translators who may perform the translation, and the LTM system provides the translation to the customer. In some embodiments the LTM system may determine a price for a translation and/or facilitate payment on behalf of, or from, the customer, to the translator who provided the translation for the customer.

The following example scenario illustrates how the LTM system may be implemented in the context of an online mediated language translation market. A customer may provide an item to be translated, for example by typing or entering a phrase into his mobile computing device (such as a smart phone, tablet, electronic book reader, or any other type of portable computing device), by recording audio or video via a digital camera on the mobile computing device or by capturing an image or photograph via the digital camera on the mobile computing device. The customer may then submit the item to the LTM system as part of a translation request. The LTM system may also enable the customer to provide additional information (which may be referred to as translation parameters herein) associated with an item (e.g., an input item) and/or the translation request, such as the input or originating language (if known), a language to translate the item to (e.g., an output language which may default to the customer's native language, if known) and/or a desired output format (e.g. same as input, audio or visual, etc.). The customer may also indicate a preferred translator (e.g. as selected from a preferred list of translators for the customer), a level of service desired and/or a bid or offer price for the translation.

Once the LTM system receives the translation request from the customer, the LTM system may look up, identity, determine or otherwise access one or more translators who may be qualified and/or available to provide the translation for the customer, based at least in part on the input item and/or the translation parameters. For example, the LTM system may store or have access to a data store which stores information indicative of translators who have registered with the LTM system or market. There are multiple ways in which the LTM system may determine whether a translator may be qualified and/or available to provide the translation, as will be described in more detail herein. In this illustrative example, the LTM system may determine that a translator is online and qualified to translate the input item from the input language to the output language.

Continuing the example scenario, once the LTM system identifies a translator (or multiple translators), the LTM system may then route, send or otherwise provide the input item to the translator for translation. The translator performs the translation and provides back to the LTM system an output item representing the input item translated into the output language. In some instances the output item may be provided in the customer-preferred output format (if known).

According to some embodiments, the LTM system may then provide the output item directly to the customer. In other embodiments, the LTM system may perform additional processes or routines before the output item is provided to the customer. For example, in some cases multiple output items may be received from multiple translators, and the LTM system may be configured to apply a selection process or routine to determine which output item to provide to customer, such as the process illustrated and described with respect to FIG. 4 herein. In one embodiment, the LTM system may compare the multiple output items to each other, and/or to a machine-generated translation output, and/or to one or more translation output items which may be accessed from a translation data store (such as the translation data store 145 discussed in more detail with reference to FIG. 1 herein), in order to determine which output item has a highest quality rating (e.g., based at least in part on accuracy of the translation and/or other factors). The output item with the highest quality rating may then be provided to the customer. In some embodiments, multiple output items may be provided to the customer, who may be given the option to select a preferred output item and/or to indicate to the LTM system which output item was selected for use.

In some implementations, an individual may submit a translation request to a mobile service provider, which forwards the translation request to be received by the LTM system. The LTM system can perform the translation and provide the output to the mobile service provider. Thus, in some such implementations, the LTM system can be a third-party system, and the customer can be the mobile service provider rather than the individual. Accordingly the customer may be the individual, or the customer may be the mobile service provider forwarding the translation request on behalf of the individual to the LTM system for translation processing.

The LTM system may implement additional or different selection criteria as part of the selection processes described herein. For example, the output item provided to the customer may be selected based at least in part on price (e.g., a lowest ask price from among the multiple translators), response time (e.g., the output item may be selected from a translator which provided the translated output item to the LTM system first), language qualification (e.g., the output item may be selected from a translator most qualified to translate between the input and output languages) and/or translator rating (e.g., the output item may be selected from a translator with a highest translator rating).

An individual who speaks and/or knows multiple languages who may wish to rent his/herself out as an on-demand translator can register with the LTM system as a translator. The LTM system may implement one or more validation processes to check whether the individual is qualified to translate one or more languages as indicated by the individual. For example, the LTM system may require the individual to translate one or more items in the languages indicated by the individual, and the LTM system may compare the translations provided by the individual to translations known to be accurate (such as translations stored in the translation data store) to assess whether the translator is qualified. In some embodiments the LTM system may implement a routine of automated quality assurance by, for example, randomly generating and sending translation requests to registered translators, and comparing the received translations to known translations to assess accuracy and update the translator's qualifications as necessary. For example, a translator may initially register and qualify as a translator for English to French (and vice versa), but over time if the translator does not provide many English/French translations (or simply stops practicing) this qualification may become outdated. The automated and/or random quality assurance process described herein may be useful to keep the translator data store current in order to reduce the likelihood of erroneous or low-quality translations and provide better overall service to the customer.

The LTM system may also implement one or more processes to enable customer ratings and/or feedback for translators and/or translations. For example, the customer may be asked to rate a translation or a translator. The translation rating and/or translator rating may be stored and accessed by the LTM system. The LTM system may use these ratings to determine whether a translator is qualified to perform translations for particular languages. For example, if a translator receives a certain number of low ratings for translations of a language, the LTM system may determine that the translator is not qualified to translate the language and update the translator data store accordingly. In another example, highly rated translations may be stored and/or updated in the translation data store to facilitate future possible re-use.

The LTM system may be configured to determine a price (or fee) for a translation. Depending on the embodiment, various approaches and factors may be used as part of a price determination process performed by the LTM system, such as the process illustrated and described with reference to FIG. 3 herein.

Certain embodiments of the LTM system may also provide various translation services or service levels. For example, customers may be provided an option to request a translator's service on a retainer or rental basis such that the customer might have access to the translator for a limited period of time in exchange for paying a rate (e.g. an hourly rate for the translator's time) or a flat fee (e.g. a price for a particular translator service). Additional services may be available depending on the embodiment and/or the context. For example, in some cases the customer may wish to acquire a local guide or translator. The LTM system may be able to access location information (such as Global Positioning System ("GPS") coordinates or geo-location information) for the customer and for one or more translators, provide an indication to the customer that one or more local translators may be available, and facilitate the customer's rental of one of the local translators if desired. In some embodiments the customer may be provided an option to request relevant local information along with a translation request, in exchange for a higher price or fee.

The LTM system may also enable customers to maintain one or more preferences, including but not limited to a default or native language, one or more preferred translators (such as the customer's favorite translators), one or more frequently requested output languages, preferred services, and so on.

As described herein, embodiments of the LTM system provide customers the ability to request translation of an input item (e.g. an item to be translated) from a first or input language to a second or output language. For ease of explanation, the examples described herein involve translation of an input item from an input language to an output language; however, in some embodiments the LTM system and methods may be applied to translation of an input item from an input language to multiple output languages; or translation of an input item in multiple input languages to one or more output languages; and so forth in any combination of input and output languages (e.g., 1-to-1, 1-to-many, many-to-1, many-to-many, etc.).

An input item or an output item may be any type of item capable of capturing or conveying communication via sensory input or output, including digital media and/or documents capable of transmission over a computer network, including but not limited to, a text item (e.g., any type of alphanumeric, character or logographic-based text, etc.); an audio item (e.g., a voice recording, an audio recording such as a musical performance, etc.); a video item (e.g., a video recording, a scene, clip or segment of a film, etc.); an image item (e.g., a photograph, a graphical image, an image-based representation of a text item, etc.); a touch-based item of communication (e.g. braille, vibration, data from a touch pad or pressure sensor, etc.); and/or any combination thereof (e.g., an audio-video recording, a text item with an associated audio recording, a video recording comprising text, etc.). Input items can be communicated to the LTM system via a network link, electronic mail, text message (Short Message Service (SMS) or Multimedia Message Service (MMS)), and so forth.

As described herein, in various embodiments an input language and/or an output language may each be a language that is native, foreign, known or unknown to the customer requesting the translation, in any possible combination thereof. A few examples include: the customer may request translation of an input item from a native language to a foreign language, or vice-versa; or the customer may request translation of the input item from a known (or partially known) language to an unknown (or partially known) language, or vice-versa; or the customer may request translation of the input item from a first foreign language to a second foreign language. The customer may or may not be fluent in an input or output language orally (e.g., speaking, listening), visually (e.g., text and/or alphanumeric, literate or illiterate, image recognition), and/or socially, culturally or contextually (e.g. the meaning of a word or phrase may vary in different societies, cultures or contexts). As used herein, language may also refer to a dialect, slang, vernacular, regional or local speech, sign language (e.g. American sign language ("ASL") or any type of sign language, type of gestural or body language, etc.) or any other form of language used to convey meaning. For example, an input or output item could include a video of a person signing or gesturing.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential to each embodiment.

Examples of Language Translation Mediation Systems

FIG. 1 is a general architecture diagram schematically illustrating an example of an language translation mediation ("LTM") system 100 that performs and provides the language mediation services described herein, including receiving translation requests, routing the translation requests to qualified and available translators, receiving translations from the translators, forwarding and/or selecting (as needed) the translations to the customer and determining prices for translations and/or translation services. The LTM system 100 can include any system capable of receiving and processing translation requests and providing translations to a requesting customer. For example, in the illustrated embodiment of FIG. 1, the LTM system 100 communicates with user computing devices 105 using a network 110A to receive translation requests. In FIG. 1, the LTM system 100 includes several components, such as a translation request processing engine 120, a price determination engine 125, and translation selection engine 130, configured to execute the methods for language translation mediation described herein. These components may also include further components which may not be depicted in FIG. 1. For example, LTM system 100, the translation request processing engine 120, the price determination engine 125, and/or the translation selection engine 130 can also include one or more servers (e.g., a web server) configured to receive and respond to requests from the user computing devices 105.

The LTM system 100 can also include a translator data store 140 which may store data related to translators registered with the LTM system 100. Data or attributes related to translators registered with the LTM system 100 may include, for example, languages each translator is qualified to translate (input and output languages), translation services offered (e.g., translation of text, translation of audio, translation of visual content such as images, local information services, tour guide and/or in person translator-for-rent services, etc.), location, time zone, time availability (e.g., periods of time when the translator is available for service) and ask prices (or fees) for translation services offered.

The LTM system 100 may also include or have access to a translation data store 145 which stores translations for items which have previously been translated. Translations stored in the translation data store 145 may include multiple input items and corresponding translated output items, such as output items provided by translators registered with the LTM system, output items generated by machine or computer-based translation services and/or algorithms, and/or other items such as commonly known translations. In some embodiments, the LTM system 100 may access the translation data store 145 to retrieve translations for input items received from customers, either in conjunction with or instead of routing the translation request to one or more translators. For example, translations accessed from the translation data store 145 may be used as part of the translation selection and comparison processes described herein. In another example, translations for common phrases may be accessed from the translation data store 145 instead of routing the translation request to a translator. In yet another example, the translation data store 145 may be accessed if the LTM system 100 determines that no translators are qualified and/or available to perform a requested translation. In one embodiment, the translation data store 145 may be used by the LTM system 100 to learn over time which translations are better than others, and/or to use the stored translations as a training set for machine-based translations. Various machine-learning techniques may be used including for example nearest neighbor, factorization techniques, K-means clustering, similarity measures including log likelihood similarity and cosine similarity and latent semantic analysis. This may be particularly advantageous because machine-based translations are typically text-based items, whereas the translation data store may store translations of text, audio and/or other visual based items in various combinations. In one embodiment, the translation data store 145 may be protected by one or more security measures to limit access to authorized and/or authenticated individuals, entities or systems.

The translation request processing engine 120 may receive, route and/or manage the translation requests and processes of the LTM system 100. The translation request processing engine 120 may receive and process translation requests received from, for example, user computing devices 105, access the translator data store 140 to look up, identify and/or determine one or more translators qualified and available to provide the requested translation, and route translation requests to the appropriate translators. The translation request processing engine 120 can be in communication with translator computing devices 107 via a network 110B. The networks 110A and 110B may include multiple networking devices (not shown) such as, e.g., switches, edge routers, core routers, etc. The network 110B may, but need not be, a different network than the network 110A shown in FIG. 1. FIG. 1 includes the two networks 110A and 110B to illustrate the concept that the LTM system 100 may act as an intermediary or mediator between the user computing devices 105 and the translator computing devices 107.

In the embodiment shown in FIG. 1, the LTM system 100 includes a price determination engine 125 to determine prices for translations and/or translation services. Price determination may be based at least in part on a number of factors including complexity of the translation request and/or languages, customer feedback ratings of translators, level of service provided, and any other factor which may be relevant to, or a component of, the price. The price determination engine 125 may also be configured to facilitate payment for translations and/or translation services from, or on behalf of, the customer to the translator providing the translation and/or translation service.

In one embodiment, the LTM system 100 can further include a translation selection engine 130 to select translations to provide to customers in response to translation requests. The translation selection engine 130 may select from translations received from translators, translations accessed from the translation data store 145 and/or translations which may be generated by the LTM system 100 using machine-based translation algorithms. The translation selection engine 130 may also be configured to store, update and retrieve data for translations in the translation data store 145, data for translators in the translator data store 140 and other data used in conjunction with servicing translation requests. For example, the translation selection engine 130 may be configured to receive a rating or feedback for a translation and/or translator and update the translator data store 140 appropriately. In one embodiment, translation feedback may include an indication of fitness for use, in which a customer may indicate whether a translation was "fit" or suited for the customer's particular use. For example, an otherwise "perfect" or highly accurate translation may receive a poor fitness for use rating if the translation did not satisfy the customer's particular use for the translation.

In some embodiments, the LTM system 100 and its components are executed or embodied by one or more physical or virtual computing systems. For example, in some embodiments, the LTM system 100 and/or one or more of its components, e.g., the engines 120, 125, and 130, can include a server computing system that has components including a central processing unit (CPU), input/output (I/O) components, storage, and memory may be used to execute some or all of the components or functionality of the LTM system 100. The server computing system may also include multiple distinct physical servers or other computing devices. The I/O components can include a display, a network connection to the network 130, a computer-readable media drive, and other I/O devices (e.g., a keyboard, a mouse, speakers, etc.). An embodiment of the LTM system 100 can be stored as one or more executable program modules in the memory of the server, and the LTM system 100 can interact with computing nodes (e.g., physical computing systems and/or virtual machine instances) over the networks 110A and/or 110B. In one embodiment, the LTM system 100 may have additional components or fewer components than described above. For example, in one embodiment, the translator data store 140 and/or translation data store 145 may be external components which are accessed by the LTM system 100 over a network (e.g. the networks 110A or 110B). Also, although the translator data store 140 and the translation data store 145 are depicted as separate components in FIG. 1, in other embodiments, the data stores 140, 145 may be combined. Further, the LTM system 100 may be built on top of existing language translation systems and/or data stores and be designed to coordinate the actions of the existing systems.

In other embodiments, the LTM system 100 may be configured differently, include different components or modules, and/or omit some components or modules shown in FIG. 1. For example, in one embodiment, LTM system 100 includes one or more hardware processors in communication with a computer readable medium storing software modules including instructions that are executable by the one or more hardware processors, and one or more software modules including a translation request processing computer module, a price determination computer module and/or an translation selection computer module. The one or more software modules may execute the various methods, approaches, and/or techniques as described herein.

Examples of Methods Performed by a LTM System

Figure 2:
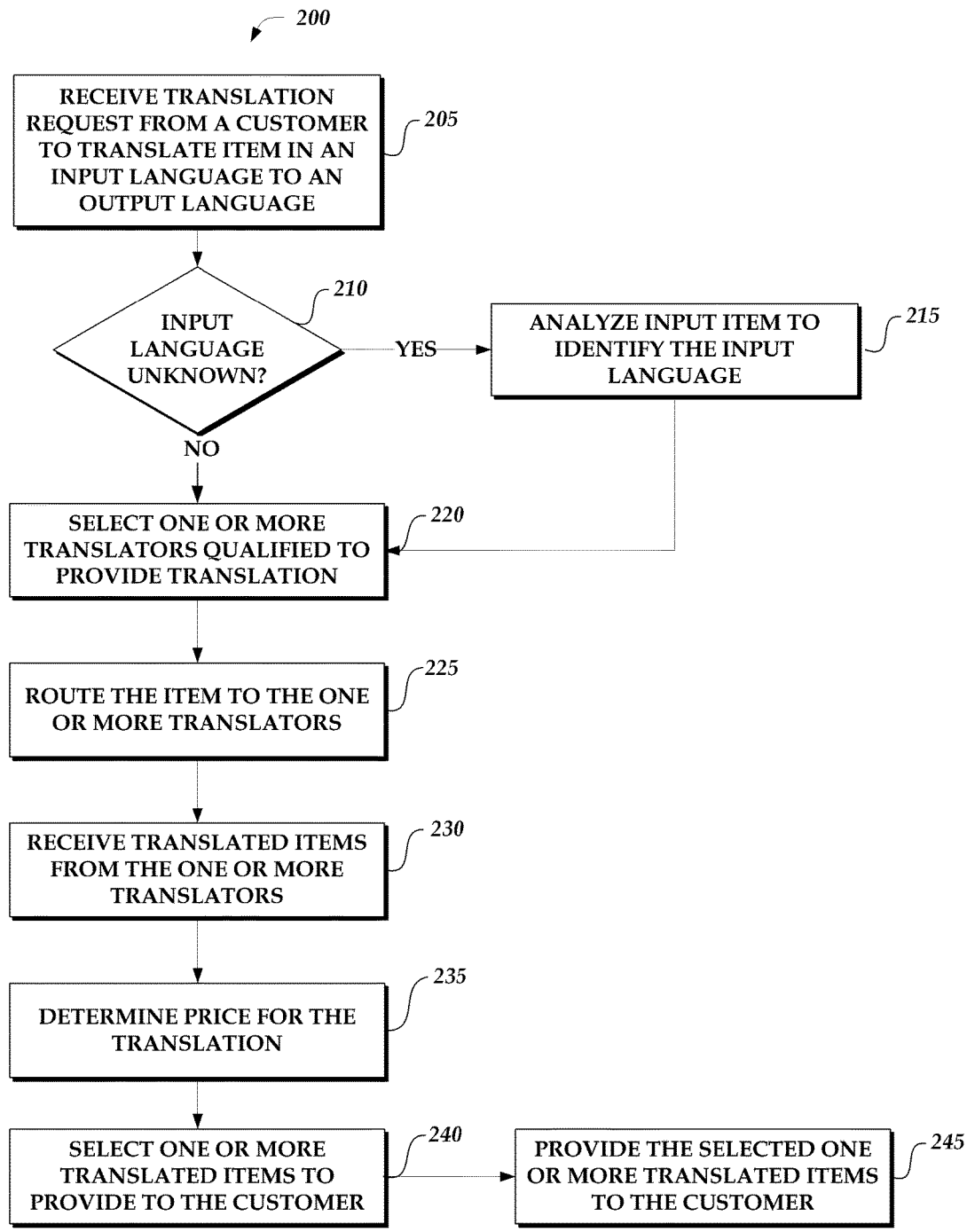
FIG. 2 schematically illustrates a logical flow diagram of an embodiment of a process for receiving and servicing a translation request from a customer involving a language translation mediation system, such as the language translation mediation system of FIG. 1.
Figure 3:
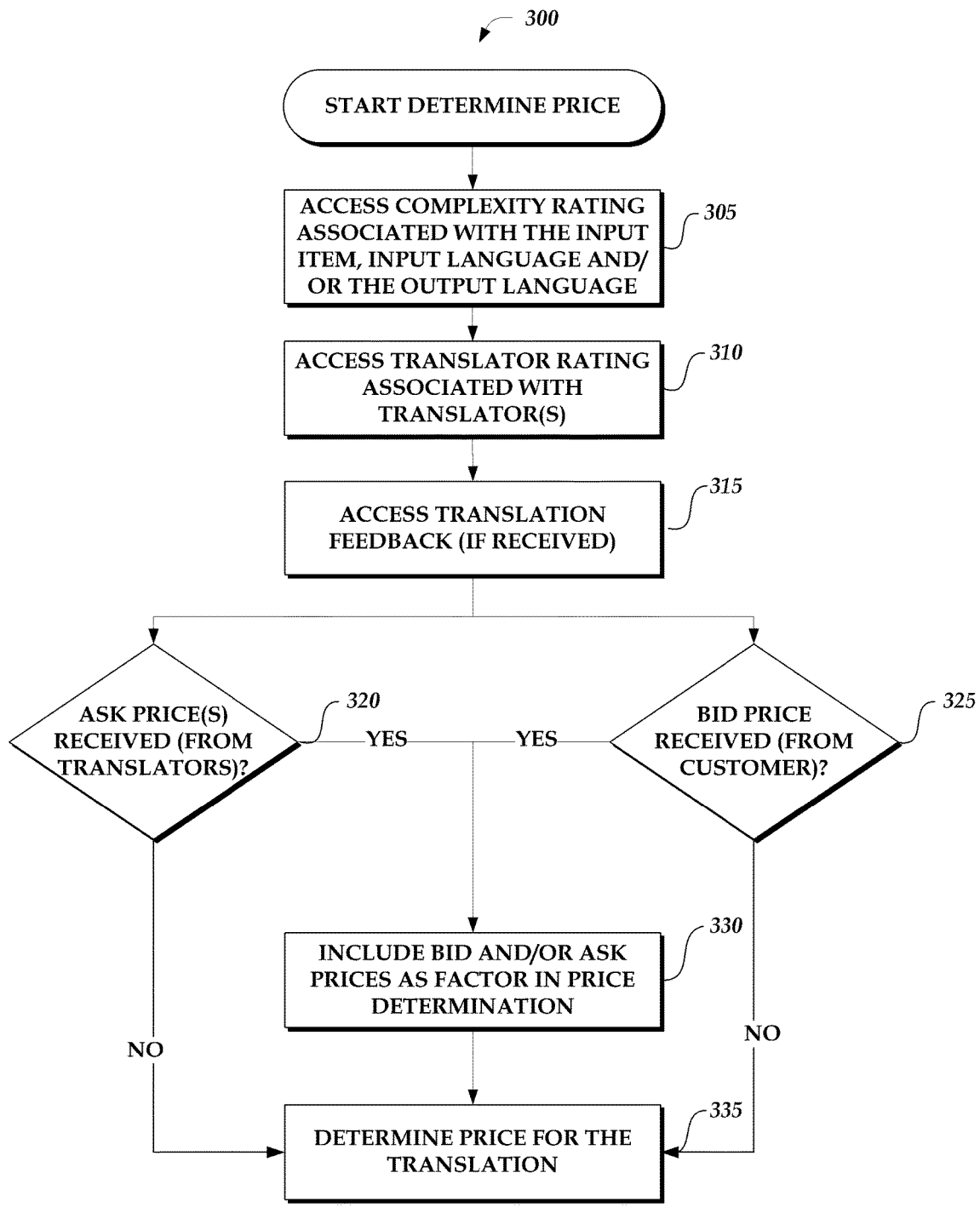
FIG. 3 schematically illustrates a logical flow diagram of an embodiment of a process determining a price for a translation involving a language translation mediation system, such as the language translation mediation system of FIG. 1.
Figure 4:
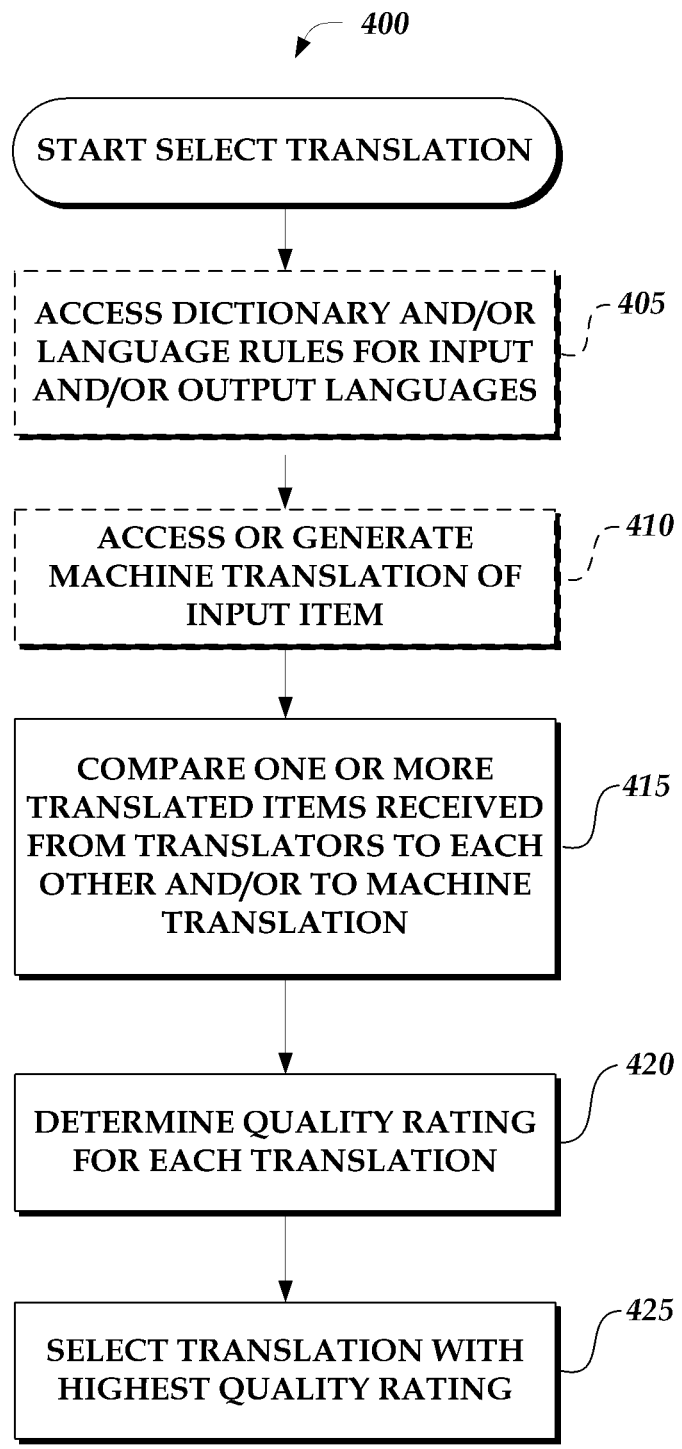
FIG. 4 schematically illustrates a logical flow diagram of an embodiment of a process for selecting one or more translated items to provide to the customer involving a language translation mediation system, such as the language translation mediation system of FIG. 1.

FIGS. 2, 3, and 4 are logical flow diagrams for various embodiments of language translation mediation routines which involve servicing translation requests received from customers, determining prices for translations based at least in part on various factors and selecting translations to provide to customers in response to translation requests. In some implementations, the routines are performed by embodiments of the LTM system 100 described with reference to FIG. 1 or by one of its components, such as the translation request processing engine 120, the price determination engine 125 and/or the translation selection engine 130. For ease of explanation, the following describes the services as performed by the LTM system 100. The example scenarios are intended to illustrate, but not to limit, various aspects of the LTM system 100. In one embodiment, the routines can be dynamic, with some procedures omitted and others added. In one example, multiple instances of the routines may be occurring concurrently, for different language translation requests and services.

FIG. 2 schematically illustrates a logical flow diagram of an embodiment of a process 200 for receiving and servicing a translation request from a customer. The process 200 may be executed, for example, by the translation request processing engine 120, the price determination engine 125 and/or the translation selection engine 130 of the LTM system 100 of FIG. 1. At block 205, the LTM system 100, for example via the translation request processing engine 120, receives from a customer a translation request to translate an input item from an input language to an output language. At block 210, the LTM system 100 may initially check whether the input language is unknown. For example, the customer may not know what language the input item is in, which may be the case for a text-based logographic input language (such as Chinese or Japanese), or an audio-based input item in which the customer does not recognize a verbal language.

If the input language is unknown, the process 200 may proceed to block 215 where the LTM system 100 may analyze the input item to identify the input language. For example, the translation request processing engine 120 may be configured to analyze, parse or scan the input item to identify recognizable characters (e.g. for text-based input items), image patterns (e.g. for image-based input items) and/or syllables or phonemes (e.g. for audio-based input items). Various speech recognition techniques and algorithms may be used, including for example acoustic modeling and language modeling, Hidden Markov Models ("HMM"), dynamic time warping ("DTW") and neural networks.

Once the input language (or a likely input language) has been identified (either as indicated by the customer's translation request or as determined at block 210) the process 200 moves to block 220 where the LTM system 100 may select one or more translators qualified to provide the translation. The one or more translators may be selected for example by accessing the translator data store 140, using the input language and the output language as minimum criteria to select qualified translators. Selection of one or more translators may be based on other factors including an estimated or predicted response time (e.g. fastest response time), a price (e.g. lowest price, lowest price for a requested service level, etc.), availability of the one or more translators, quality ratings associated with the one or more translators, and so on. Additional selection criteria may be used, and may be based in part on one or more translation parameters associated with the translation request, including for example a bid price, a service level (or level of service desired), a request for a particular translator, a request to rent a translator for a period of time, a request to translate the input item to a dialect associated with the output language, a request for local information associated with the output language, or a request for a local translator. The service level (or level of service desired) may include, for example, one or more services or service factors, such as, a turnaround time or time scope (e.g., immediate, as soon as possible, by a certain time, anytime, etc.), a required quality level (e.g., basic or "good enough," expert level, highest quality for a price, etc.), an intended or desired use or context for the translation (e.g. for medical, legal or other professional use), and a duration for the service (e.g., "now" or one-time only, extended engagement or retainer, etc.)

Next at block 225 the LTM system 100 routes the input item to the one or more translators who perform the translation. At block 230, the LTM system 100 receives translated items from the one or more translators.

At block 235 the LTM system 100, for example via the price determination engine 125, determines a price for the translation request. Determining the price may involve several processes and factors, as described for example in more detail with reference to FIG. 3 herein. In some embodiments the LTM system 100 may determine the price for the translation request before routing the input item to the one or more translators at block 225. For example, in some instances determining the price may be based at least in part on ask prices associated with the translators, and as a result some translators may be "outbid" or priced out. In such a case the LTM system 100 may not route the item for translation to the outbid or priced out translators. In another embodiment the price may be determined by a market price (e.g., for a common or known phrase, for a basic service, or any other translation service which may have a market price that is known, defined or set before the translation request is routed or serviced). In another embodiment the price may be determined by a series of back-and-forth negotiations between the customer and one or more translators until an agreed-upon price is reached.

At block 240, the LTM system 100, for example via the translation selection engine 130, selects one or more translated items to provide to the customer. Translation selection may be based on, for example, an actual response time (e.g. fastest translator to respond and provide a translated item), a price (e.g. lowest price, lowest price for a requested service level, etc.), quality of the translated items (e.g. highest quality within a specified amount of time, highest quality for a specified amount of money or bid/ask price, etc.), quality ratings associated with the one or more translators, and so on. Selecting one or more translated items may involve several processes and factors, as described for example in more detail with reference to FIG. 4 herein.

At block 245, the LTM system 100 provides the selected one or more translated items to the customer. The process 200 can then end.

FIG. 3 schematically illustrates a logical flow diagram of an embodiment of a process 300 for determining a price for a translation. The process 300 may be executed, for example, by the price determination engine 125 of the LTM system 100 of FIG. 1.

At block 305, the price determination engine 125 may assess a complexity rating for the input item. The complexity of the input item may include, for example, the length of the input item (such as whether the input item is a word, a phrase, several phrases or sentences, a paragraph or longer) and/or the type of the input item (such as whether the input item is text, audio, video and so forth). For example, a translation of a short text-based phrase may contribute to a lower determined price than a translation of a five minute audio recording.

Also at block 305, the price determination engine 125 may access a complexity rating of the input language, the output language, and/or a combination thereof. For example, a translation from English to French may contribute to a lower determined price than a translation from Japanese to Russian, due to the relative complexity of and/or differences between the respective languages. For example, a higher determined price may result if the alphabet, grammar, word order or composition, word segmentation, and/or phonetics or phonology are dissimilar between the input and output languages. The price may also be based in part on a translator rating associated with the translator providing the translation. For example, a translation from a lower-rated translator may contribute to a lower determined price than a translation from a higher-rated translator.

At block 310 the price determination engine 125 may access a translator rating associated with each translator which may have provided a translated output item (e.g., as received at block 230 of FIG. 2 described herein). The translator rating may be a contributing factor for the price in that higher-rated translators may demand or otherwise justify a higher price than lower-rated translators.

At block 315, in some embodiments the customer may have provided feedback and/or a rating for the translated item, in which case the price determination engine 125 may access the translation feedback for use as a factor in the price determination. For example, a poorly rated translation may contribute to a lower price.

In some embodiments, the LTM system may be able to determine a price based at least in part on a bid/ask price approach. A translation request from a customer may include a bid or offer price representing the maximum amount the customer is willing to pay for the translation. A translator may have a minimum ask price (which can also be used as part of the translator/translation selection process). In one embodiment, the translator may perform a translation and submit an ask price with the provided translation. In another embodiment, the translator may provide an ask price for the translation prior to performing the translation. Thus, separately or concurrently at blocks 320 and 325 the price determination engine 125 may determine whether any ask prices have been received from the translators and/or whether a bid price has been received from the customer.

If either ask prices or a bid price has been received at blocks 320 or 325 respectively, the process 300 may proceed to block 330, where the price determination engine 125 includes the ask prices and/or bid price as factors in the price determination. The LTM system may use the ask and bid prices to determine the price by taking the lowest ask price from among all the selected and/or available translators, subject to the customer's maximum bid price (if known or provided). In some instances, if the customer's bid price is too low (or the translator's ask price is too high), no translation may be provided and the customer may be prompted by the LTM system to lower their bid price (or the translator may be prompted to lower their ask price).

At block 335, the price determination engine 125 determines the price for the translation based at least in part on the factors and processes described in blocks 305 to 330. Also, although not illustrated in FIG. 3, in some embodiments, the LTM system may further determine a price by setting a lower and/or a fixed rate for common phrases, for translations provided to the customer by using translations stored in the translation data store or for translations provided using machine-based techniques or algorithms.

The examples of the bid/ask price approach described herein (e.g. with respect to the process 300) may also apply in other ways. For example, in some embodiments, a bid price may be associated with a translator and an ask price may be associated with a customer. Thus a translator may set one or more bid prices indicating prices at which the translator offers one or more services, and a customer may set one or more ask prices indicating prices at which the customer requests one or more services. That is, in some embodiments, customers may place bids for translator services, while in other embodiments translators may place bids to perform translations for customers. Thus in general, bid prices and ask prices used herein merely to illustrate and describe particular examples of a general market price system which may be utilized by the LTM system 100, in which "prices" of the general market price system include at least bid, ask and/or set prices from buyers and/or sellers. In another example, buyers in the general market price system may be either customers (e.g., "buying" a translation or translation service) or translators (e.g., "buying" an option to provide a translation or translation service); and/or sellers may be either customers (e.g., "selling" an option to provide a translation or translation service) or translators (e.g., "selling" a translation or translation service).

Further, in some embodiments, the price may be determined through a series of back-and-forth price negotiations. For example, a customer may submit a bid price, and in response a translator may submit an ask price higher than the bid price, to which the customer may counter-offer a second, higher bid price (e.g., less than or equal to the ask price), and so on until an agreed price is reached. The LTM system 100 may facilitate such a price negotiation and the determined price may be the agreed price. Once the agreed price is reached the translation may be provided to the customer.

FIG. 4 schematically illustrates a logical flow diagram of an embodiment of a process 400 for selecting one or more translated items to provide to the customer. The process 400 may be executed, for example, by the translation selection engine 130 of the LTM system 100 of FIG. 1. At block 405, the LTM system 100 may optionally access a dictionary and/or language rules for the input and/or output languages.

At block 410, the LTM system 100 may optionally access or generate a machine translation of the input item. The machine translation may be stored, for example, in the translation data store 145 as a previously generated translation. In some embodiments the LTM system 100 may be configured to generate the machine translation using one or more machine translation techniques including for example rule-based, statistical, example-based and/or hybrid machine translation techniques.

Next at block 415 the LTM system 100 compares one or more of the translated items received from the one or more translators to each other and/or to the machine translation. The comparison may be performed, for example, to assess the accuracy of the translated items relative to each other and/or to the machine translation in order to identify a best, preferred, or highest quality translation.

The process 400 proceeds to block 420 where the translation selection engine 130 determines a quality rating for each translation. At block 425, the translation selection engine 130 selects one or more translations with the highest quality rating to be provided to the customer. The process 400 can then end.

Other variations on the selection process 400 may also be performed by the LTM system 100. For example, in one embodiment, the quality rating for each translation may be based at least in part on how quickly the translator provided the translation, whether the translation was provided in a specified amount of time (e.g., a turnaround time as requested by the customer, which may be included in the translation request parameters), and/or whether the translation meets certain quality criteria corresponding to a price (e.g., a bid price, an ask price, or a determined price). In another embodiment, the LTM system 100 may select one or more translations without determining quality ratings. For example, the LTM system 100 may select a translation provided by with the fastest response time by a translator and provide the translation to the customer.

Example User Interfaces

Figure 5:
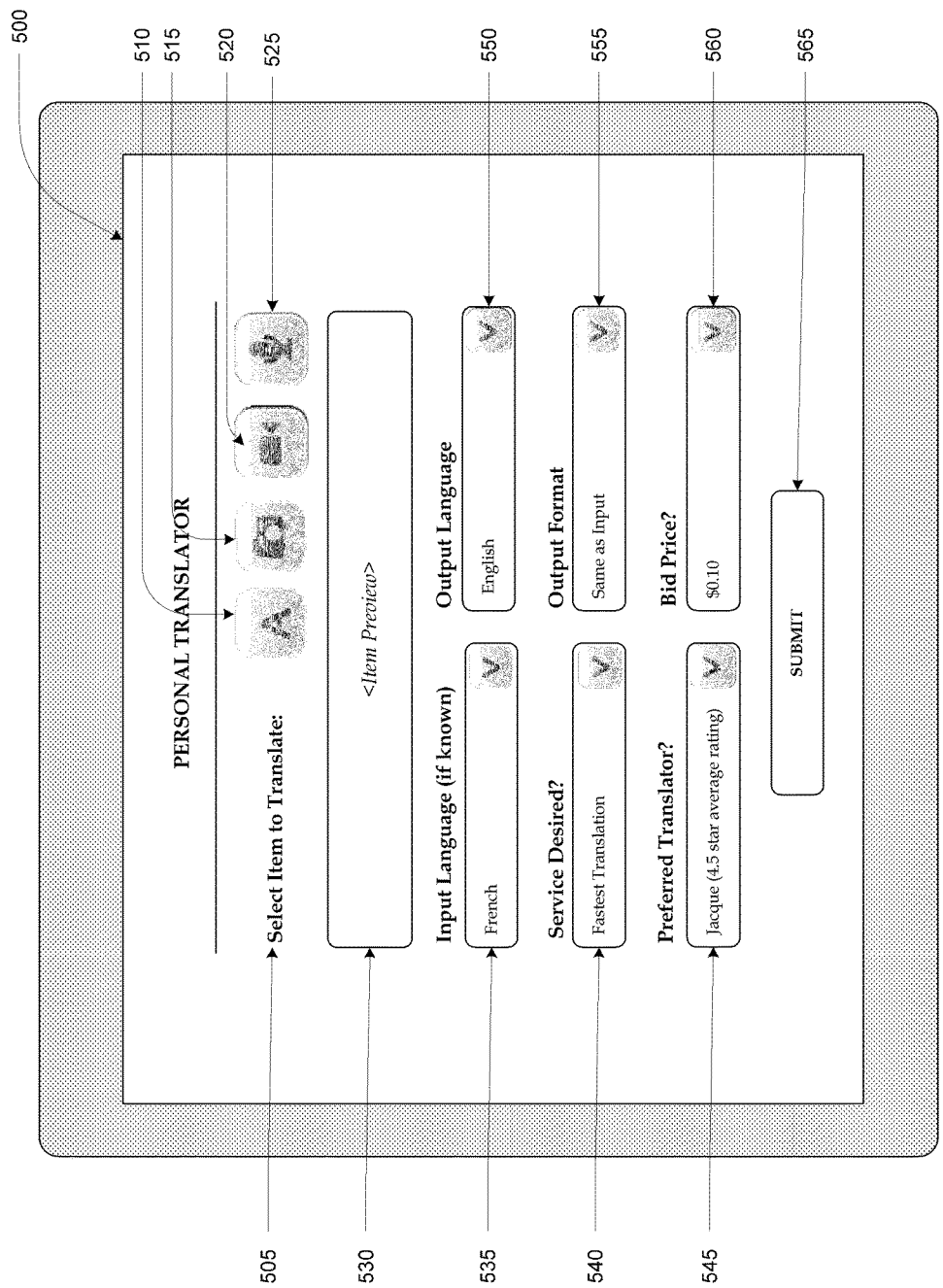
FIGS. 5 and 6 are example user interfaces which allow a customer to submit translation requests comprising input items and one or more translation parameters to a language translation mediation system, such as the language translation mediation system of FIG. 1.
Figure 6:
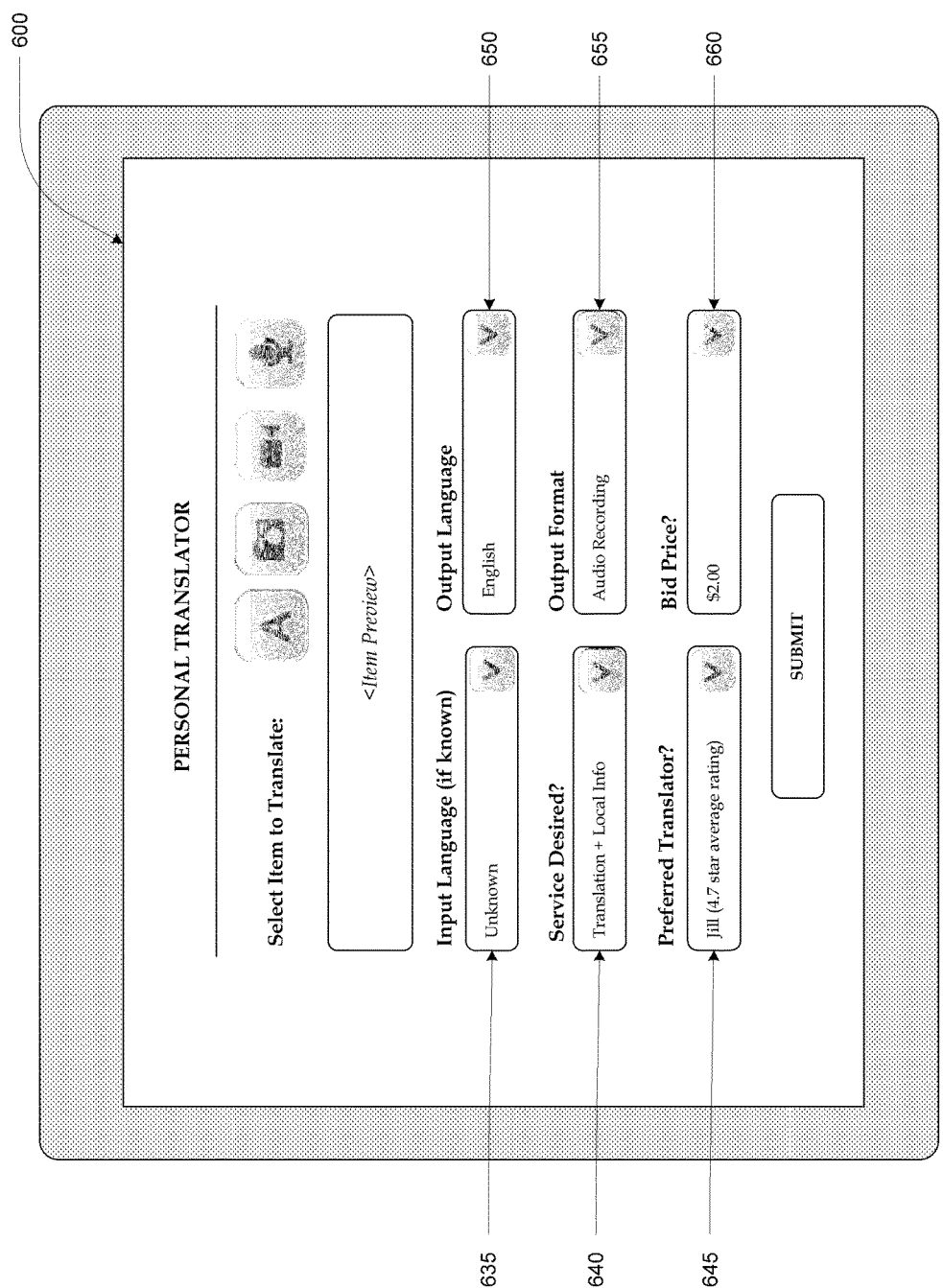
Figure 7:
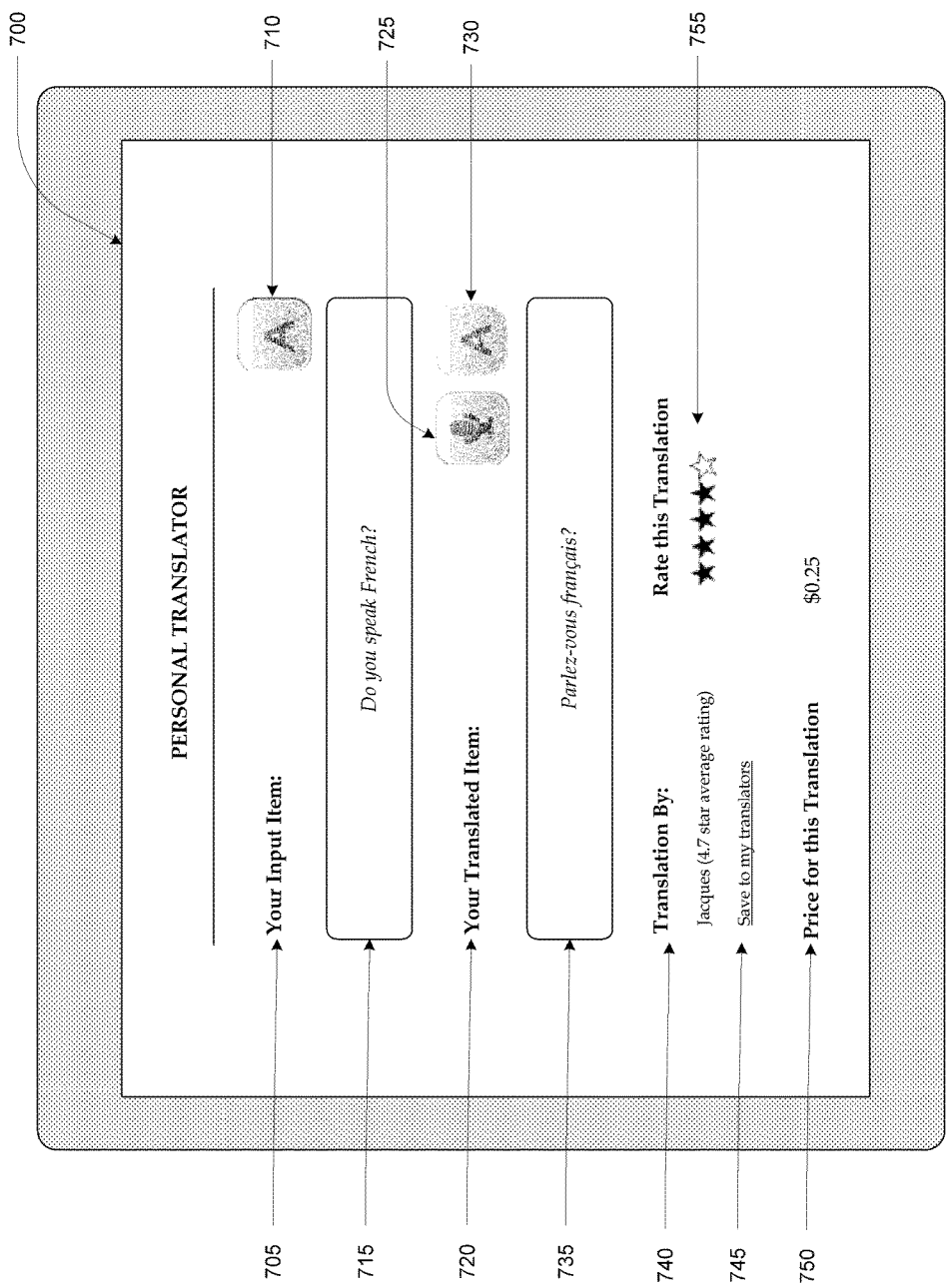
FIG. 7 is an example user interface which allows a customer to view a translation and submit ratings or feedback for the translation and/or translator involving a language translation mediation system, such as the language translation mediation system of FIG. 1.

FIGS. 5, 6, and 7 illustrate several sample "personal translator" user interfaces that may be generated by or used with the LTM system 100, providing various user interface controls to enable functionality as described in this disclosure. In various embodiments, the user interfaces shown in FIGS. 5, 6, and 7 may be presented as a web page, as a mobile application, as a stand-alone application, or by other communication means. In other embodiments, analogous interfaces may be presented using audio or other forms of communication. In an embodiment, the interfaces shown in FIGS. 5, 6, and 7 are configured to be interactive and respond to various user interactions. Such user interactions may include clicks with a mouse, typing with a keyboard, touches and/or gestures on a touch screen, voice commands, and/or the like.

FIGS. 5 and 6 are example user interfaces which allow a customer to submit translation requests, which comprise input items and one or more translation parameters, to a language translation mediation system, such as the language translation mediation system of FIG. 1. As shown in FIG. 5, the user interface 500 presents the customer with an option to select an item to translate 505, which may include one or more input options 510, 515, 520 and 525, including a text-based input selection 510, an image-based input selection 515, a video recording input selection 520 and/or an audio (e.g. voice) recording input selection 525. In response to the user selecting one of the input options 510, 515, 520 and 525 the customer may be prompted by the user interface 500 to enter text, select an image, take a photo (e.g. using a digital camera on the customer's mobile computing device), record video (e.g. using the digital camera and a microphone on the customer's mobile computing device) and/or record audio (e.g. using the microphone on customer's mobile computing device). The user interface 500 may also present a preview of the item 530, which may present a text input as it is entered by the customer, an image input (e.g. as captured by the digital camera on the customer's mobile computing device or as selected from an image gallery on the customer's mobile computing device), a preview clip of a video recording input and/or a preview clip of an audio recording input.

The user interface 500 presents the customer with several options corresponding to translation parameters for the translation request. For example, the customer may select an input language (if known) 535, a level of service desired 540, a preferred translator 545, an output language 550, an output format 555 and/or a bid price 560. In one embodiment, the preferred translator 545 element may be populated with a list of translators associated with the customer's preferences. The level of service desired 540 may include one or more services or service factors, including for example, a turnaround time or time scope (e.g., immediate, as soon as possible, by a certain time, anytime, etc.), a required quality level (e.g., basic or "good enough," expert level, highest quality for a price, etc.), an intended or desired use or context for the translation (e.g. for medical, legal or other professional use), and a duration for the service (e.g., "now" or one-time only, extended engagement or retainer, etc.) In one embodiment, the output language may have a default setting of the customer's native or preferred language. In the example shown in FIG. 5, the customer has selected "French" for the input language 535, "Fastest Translation" for the level of service desired 540, "Jacque" (with a 4.5 star average rating indicated by the user interface 500) for the preferred translator 545, "English" for the output language 550, "Same as input" for the output format 555 and "$0.10" for the bid price 560. In some embodiments some of these elements may be optional for the customer. For example, the customer might not have a preferred translator and way wish to leave this option blank, or the customer might not want to make a bid price and leave this option blank, and so on.

Once the customer has provided the item to translate and made his/her selections for the various translation options as described above, the customer may submit 565 the item for translation to the LTM system 100. The LTM system 100 may then service the translation, based at least in part on the translation parameters specified by the customer's selections via the user interface 500, according to the processes described herein.

FIG. 6 presents a similar user interface 600 to the one shown in FIG. 5, with a few different translation input parameters to illustrate a different use case scenario. In user interface 600 of FIG. 6, the customer has selected "Unknown" for the input language 635, "Translation+Local Info" for the level of service desired 640, "James" (with a 4.7 star average rating indicated by the user interface 600) for the preferred translator 645, "English" for the output language 650, "Audio Recording" for the output format 655 and "$2.00" for the bid price 660. The level of service desired 640 may include one or more services or service factors, including for example, a turnaround time or time scope (e.g., immediate, as soon as possible, by a certain time, anytime, etc.), a required quality level (e.g., basic or "good enough," expert level, highest quality for a price, etc.), an intended or desired use or context for the translation (e.g. for medical, legal or other professional use), and a duration for the service (e.g., "now" or one-time only, extended engagement or retainer, etc.)

FIG. 7 illustrates an example user interface 700 which presents a customer with a translation and allows the customer to submit ratings or feedback for the translation and/or translator involving a language translation mediation system, such as the language translation mediation system of FIG. 1. At element 705, the customer may be presented information related to the input item as provided by the customer, including a text icon 710 indicating the input item was a text-based item and an input preview box 715 showing the input phrase "Do you speak French?" as provided by the customer. At element 720, the customer may be presented information related to the output item as provided by the LTM system (via, for example, a translator, registered with the LTM system 100), including an audio recording icon 725 and a text icon 730 indicating the output item is available in an audio recorded format and/or a text-based format, and an output preview box 735 showing the output, translated phrase "Parlez-vous françis?" as provided by the translator via the LTM system 100.

User interface 700 also presents information to the customer regarding the translation, including an indicator of who provided the translation 740 (e.g. "Jacques" with a 4.7 star average rating), an option to save this translator 745 (e.g. to the customer's preferred list of translators), a price for the translation 750 (e.g. "0.25") and an option to rate the translation 755 (e.g., on a five star scale, although any rating scale may be used). In response to the customer selecting a rating for the translation, the LTM system 100 may, for example, receive the rating and update the translator data store 140 according to the processes described herein.

FIG. 8 illustrates an example user interface 800 which presents a translator with a translation request and allows the translator to submit a translation involving a language translation mediation system, such as the language translation mediation system of FIG. 1. At element 805, the translator may be presented information related to the input item as provided by the customer, including a text icon 810 indicating the input item was a text-based item and an input preview box 815 showing the input phrase "Do you speak French?" as provided by the customer. At element 820, the translator may be provide or enter his/her translation for the customer's input item, which will be provided to the customer the LTM system 100. Element 820 may include corresponding indications of the requested output (e.g. as requested by the customer or by the LTM system 100), such as an audio recording icon 825 and a text icon 830 indicating the output item for the translation should be provided in an audio recorded format and a text-based format. Although not shown in FIG. 8, additional user interface elements corresponding to any or all of one or more translation input parameters may be also be provided via the user interface 800. User interface 800 also include a translation output box 835 showing the output, translated phrase "Parlez-vous français?" as entered provided by the translator via the LTM system 100.

User interface 800 also presents information to the translator regarding the translation, including an indicator of who requested the translation 840 (e.g. "Bob Smith"), an option to save this customer 845 (e.g. to the translator's preferred list of customers), and a price for the translation 850 (e.g. a bid or ask price, such as "$0.50"). Once the translator has provided or entered the translation (e.g. via the translation output box 835) and made his/her selections for the various translation options as described above (e.g. save to my customers 845, price 850), the translator may submit 855 the translation to the LTM system 100. The LTM system 100 may then provide the translation to the customer, based at least in part on the translation selection processes described herein.

Additional Embodiments

In one embodiment, the LTM system 100 may provide language translation mediation services to multiple customers or users who are communicating with each other via the LTM system 100 and one or more translators. For example, a user (e.g., a first user) fluent in a first language may wish to communicate with a second user fluent in a second language. The first user and the second user may be able to communicate through the use of a translator via the LTM system 100, wherein the translator is qualified to translate from the first language to the second language and vice-versa. Thus, the first user and the second user may be able to carry out a dialog or conversation as mediated by the translator and the LTM system 100. In one example, the first user may initiate a conversation or submit translation request with the LTM system 100, which may select one or more qualified translators as described in other embodiments herein. The LTM system 100 may then service an item to be translated received from the first user, route the item to the one or more translators for translation, receive one or more translated items from the translators, and select and/or provide at least one of the translated items to the second user. In one embodiment, the first user may first select a translator to use for the duration of the dialog with the second user. The second user may similarly submit items for translation to the LTM system 100, which routes the items to the translator(s) servicing the dialog, and provides the translated items to the first user.

In some embodiments, the items to be translated by be provided in any combination of the input and/or output formats as described herein, at any stage of the dialog. Thus for example, the first user may provide an item as text, indicate via the translation input parameters that the item is to be translated and provided as an audio recording to the second user, who may then receive the output item as an audio recording. The second user can "answer" the first user in any desired input format and indicate a desired output format for the first user. In some instances, each of the first user and second user may indicate a preferred output format for the duration of the dialog (or for any dialog). Thus, for example, the first user may only wish to receive translated items in text-format, and the second user may only wish to receive translated items in audio format. Any variation may be possible.

Although the examples above illustrate a first user and a second user in communication via the LTM system 100 and one or more translators, in another embodiment, more than two users may be communicating in a similar fashion. For example, the LTM system 100 may facilitate a dialog or conversation between a group of users fluent in a plurality of languages, either through a selected or designated translator or through a plurality translators. As in other embodiments, selection of translations and/or determination of prices in any of the additional embodiments described here may be based on a number of different factors and/or translation input parameters.

In another embodiment, the LTM system 100 may route an item for translation through two or more translators before providing an output, translated item to a user. For example, a user may wish to translate an item from an input language to an output language, but the LTM system 100 may not be able to locate a translator qualified to translate from the input language to the output language. However, the LTM system 100 may identify a first translator qualified to translate from the input language to a third language, and a second translator qualified to translate from the third language to the output language. The LTM system 100 may provide the user with an option to use the first and second translators in order to translate the item from the input language to the third language via the first translator, then to translate the item from the third language to the output language via the second translator, and provide the translated item in the output language back to the user. In some embodiments more than two translators may be utilized in such a way to enable the user to receive translations even though a direct translator fluent in the input and the output language may not be available. The price determination may also include as a factor the number of translators used to provide a translation in this way (e.g., the price may be higher if two or more translators service the translation request in this multi-step example).

As described above, the LTM system 100 can be implemented with one or more physical servers or computing machines, such as several computing machines interconnected via a network. Thus, each of the components depicted in the LTM system 100 can include hardware and/or software for performing various features. In one embodiment, the LTM system 100 is a web site or collection of web sites.

Like the LTM system 100, user computing devices 105 can be implemented in hardware and can include any type of computing device. The user computing devices 105 can, but need not be, operated by entities who are different from one another and who are different from a user of the LTM system 100. For example, the LTM system 100 may be a web service made available to 3rd party entities by a web services provider for a fee or for free.

The LTM system 100 can include one or more servers for receiving and responding to network requests from the user computing devices 105. The one or more servers can include web servers, application servers, database servers, combinations of the same, or the like. In some embodiments, the networks 110A and 110B are publicly accessible networks of linked networks, possibly operated by various distinct parties, such as the Internet. In other embodiments, the networks 110A and 110B may be private networks, such as, for example, a corporate or university network that is wholly or partially inaccessible to non-privileged users. In still other embodiments, the networks 110A and 110B may include one or more private networks with access to and/or from the Internet. In some embodiments, the networks 110A and 110B are the same network.

The processing of the various components of the LTM system 100 can be distributed across multiple machines, networks, and other computing resources. The various components of the LTM system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the LTM system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

Other types of programmatic interactions (additionally or alternatively) between the LTM system 100 and the user computing devices 105 and/or translator computing devices 107 are possible in addition to those described above. For example, an LTM system 100 submission or command be received directly from a user (e.g., via an interactive console or other graphical user interface (GUI) provided by the LTM system 100) or from an executing program on a user computing devices 105. In some embodiments, users may interact with the LTM system 100 using other types of interfaces and in other ways. For example, the LTM system 100 may provide a web services interface (e.g., a web page or set of web pages) that allows a user to submit a request using a web browser. Other types of interfaces may also be used.

In some embodiments, the LTM system 100 or specific components of the LTM system 100 can include a server computing system that has components including a central processing unit (CPU), input/output (I/O) components, storage, and memory may be used to execute. Executable code modules that implement functionality of the LTM system 100 can be stored in the memory of the server and/or on other types of non-transitory computer-readable storage media. In some embodiments, the LTM system 100 may be configured differently than described above.

In some embodiments, the LTM system 100 may be implemented on, or in communication with, one or more hosted computing environments. The hosted computing environments may include a collection of rapidly provisioned and released computing resources hosted in connection with the LTM system 100. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586, issued on Jan. 4, 2011 and entitled "Configuring Communications Between Computing Nodes" which is hereby incorporated by reference in its entirety. A hosted computing environment may also be referred to as a cloud computing environment.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

CONCLUSION

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system for mediating language translation, the computer system comprising:

one or more computing devices in communication with a physical data store storing data for a plurality of translators, wherein the one or more computing devices are configured to:
  receive, from a customer computer, a translation request to translate an item in an input language to an output language, the translation request comprising one or more translation service request parameters;
  select, from the data store, at least a first translator associated with a first estimated response time and a second translator associated with a second estimated response time, wherein the selection is based at least in part on the input language, the output language and the one or more translation service request parameters and further based on the first estimated response time and the second estimated response time being faster than that of at least one other translator of the plurality of translators;
  route, by the one or more computing devices, the item to the first translator and the second translator;
  receive, by the one or more computing devices, a first translated item in the output language from the first translator within a first actual response time from routing the item to the first translator and a second translated item in the output language from the second translator within a second actual response time from routing the item to the second translator;
  generate, by the one or more computing devices, a machine-translated item based on performing machine translation of the item from the input language to the output language;
  determine, by the one or more computing devices, that a customer price associated with the customer, a first translator price associated with the first translator, and a second translator price associated with the second translator are available;
  determine, by the one or more computing devices, a complexity rating associated with a combination of the input language and the output language, the complexity rating based on dissimilarity between the input language and the output language with respect to alphabet, grammar, word order, word composition, word segmentation, phonetics, or phonology;
  in response to determining that the customer price, the first translator price, and the second translator price are available, determine, by the one or more computing devices, a final price for the translation request, based at least on the complexity rating associated with the combination of the input language and the output language, the customer price associated with the customer, the first translator price associated with the first translator, and the second translator price associated with the second translator such that a translation request associated with a combination of languages that exhibit a greater degree of dissimilarity with respect to alphabet, grammar, word order, word composition, word segmentation, phonetics, or phonology results in a higher final price;
  subsequent to receiving the first translated item and the second translated item and generating the machine-translated item, compare, by the one or more computing devices, (i) a content of the first translated item to a content of the second translated item and (ii) the content of the first translated item to a content of the machine-translated item to determine a first score associated with the first translated item;
  determine a second score associated with the first translated item based on the customer price, the first translator price, and the final price;
  determine, based on the first and second scores associated with the first translated item and the first and second actual response times, that the first translated item is to be displayed to the customer via the customer computer; and
  output the first translated item for display to the customer via the customer computer.

2. The computer system of claim 1, wherein the one or more translation service request parameters include a request to have access to a translator for a period of time, a request for local information associated with the output language, or a request for a local translator.

3. The computer system of claim 1, wherein the one or more computing devices are further configured to:
  provide, to the customer computer, the first translated item, the second translated item, and the machine-translated item;
  receive, from the customer computer, a selection of the first translated item, the second translated item, or the machine-translated item; and
  facilitate a payment on behalf of the customer to the first translator or the second translator based at least in part on the selection.

4. The computer system of claim 1, wherein the one or more computing devices are further configured to:
  compare the first translated item, the second translated item, and the machine-translated item to each other;
  determine a relative translation accuracy score for each of the first translated item, the second translated item, and the machine-translated item based at least in part on the comparison; and
  select the first translated item based at least in part on which of the first translated item, the second translated item, and the machine-translated item has the highest relative translation accuracy score.

5. The computer system of claim 1, wherein the item comprises text, an image, audio, or video.

6. A computer-implemented method comprising:
  as implemented by a computer system comprising computer hardware and memory, the computer system configured with specific executable instructions,
  receiving, from a user computing device, a translation request to translate an item in an input language to an output language;
  selecting, from a data store comprising information about a plurality of translators, at least a first translator and a second translator, wherein the selection is based at least in part on the input language, the output language, a first estimated response time associated with the first translator, and a second estimated response time associated with the second translator;
  routing, by the computer system, the item to the first translator and the second translator;
  receiving, by the computer system, a first translated item in the output language from the first translator and a second translated item in the output language from the second translator;
  generating, by the computer system, a machine-translated item based on performing machine translation of the item from the input language to the output language;
  determining, by the computer system, that one or more of a user price associated with the user, a first translator price associated with the first translator, or a second translator price associated with the second translator is available;

determining, by the computer system, a complexity rating associated with a combination of the input language and the output language, the complexity rating based on dissimilarity between the input language and the output language with respect to alphabet, grammar, word order, word composition, word segmentation, phonetics, or phonology;

in response to determining that one or more of the user price, the first translator price, or the second translator price is available, determining, by the computer system, a final price for the translation request, based at least on (i) the one or more of the user price, the first translator price, or the second translator price and (ii) the complexity rating associated with the combination of the input language and the output language such that a translation request associated with a combination of languages that exhibit a greater degree of dissimilarity with respect to alphabet, grammar, word order, word composition, word segmentation, phonetics, or phonology results in a higher price;

subsequent to receiving the first translated item and the second translated item and generating the machine-translated item, comparing, by the computer system, (i) a content of the first translated item to a content of the second translated item and (ii) the content of the first translated item to a content of the machine-translated item to determine a first score associated with the first translated item;

determining a second score associated with the first translated item based on the user price, the first translator price, and the final price;

determining, based on the first and second scores associated with the first translated item, that the first translated item is to be displayed via the user computing device; and outputting the first translated item for display via the user computing device.

7. The computer-implemented method of claim 6, wherein determining the final price for the translation request is based at least in part on the user price, the first translator price, and the second translator price.

8. The computer-implemented method of claim 6, wherein determining the final price for the translation request is based at least in part on a first translator rating associated with the first translator.

9. The computer-implemented method of claim 6, further comprising:

receiving, from the user computing device, a translation feedback rating for the first translated item outputted for display via the user computing device; and wherein determining the final price for the translation request is based at least in part on the translation feedback rating.

10. The computer-implemented method of claim 6, further comprising:

receiving, from the user computing device, one or more translation service request parameters along with the translation request; and wherein selecting at least a first translator and a second translator is based at least in part on the one or more translation service request parameters.

11. The computer-implemented method of claim 10, wherein the one or more translation service request parameters include a request to rent a translator for a period of time, a request for local information associated with the output language, or a request for a local translator.

12. The computer-implemented method of claim 11, wherein determining the final price for the translation request is based at least in part on one of the one or more translation service request parameters.

13. The computer-implemented method of claim 6, wherein the item comprises text, an image, audio, or video.

14. The computer-implemented method of claim 6, further comprising:

comparing the first translated item, the second translated item, and the machine-translated item to each other;

determining a relative translation accuracy score for each of the first translated item, the second translated item, and the machine-translated item based at least in part on the comparison;

selecting the first translated item in response to determining that the first translated item has a better relative translation accuracy score than the second translated item and the machine-translated item; and outputting the first translated item for display via the user computing device.

15. Non-transitory computer storage having stored thereon a computer program, the computer program including one or more modules configured for execution by a computing system, the one or more modules configured to:

receive, from a user computing device, a translation request to translate an item in an input language to an output language;

select, from a translator data store, at least a first translator associated with a first estimated response time, wherein the selection is based at least in part on the input language and the output language and further based on the first estimated response time being faster than that of at least one other translator;

route, by a computer system, the item to the first translator;

receive, by the computer system, a first translated item in the output language from the first translator;

generate, by the computer system, a machine-translated item based on performing machine translation of the item from the input language to the output language;

determine, by the computer system, that one or more of a user price associated with the user or a first translator price associated with the first translator is available;

determine, by the computer system, a complexity rating associated with a combination of the input language and the output language, the complexity rating based on dissimilarity between the input language and the output language with respect to alphabet, grammar, word order, word composition, word segmentation, phonetics, or phonology;

in response to determining that one or more of the user price or the first translator price is available, determine, by the computer system, a final price for the translation request, based at least on (i) the one or more of the user price or the first translator price and (ii) the complexity rating associated with the combination of the input language and the output language such that a translation request associated with a combination of languages that exhibit a greater degree of dissimilarity with respect to alphabet, grammar, word order, word composition, word segmentation, phonetics, or phonology results in a higher price;

subsequent to receiving the first translated item and generating the machine-translated item, compare, by the computer system, a content of the first translated item to a content of the machine-translated item to determine a first score associated with the first translated item;

determine a second score associated with the first translated item based on the user price, the first translator price, and the final price;

select the first translated item for display based on the first and second scores associated with the first translated item; and output the first translated item for display via the user computing device or another user computing device.

16. The non-transitory computer storage of claim 15, wherein the one or more modules are further configured to:
identify the input language.

17. The non-transitory computer storage of claim 15, wherein the one or more modules are further configured to:
determine the final price based at least in part on a translator rating associated with the first translator.

18. The non-transitory computer storage of claim 15, wherein the one or more modules are further configured to:
receive, from the user computing device, a translation feedback rating for the first translated item provided to the user; and
determine the final price for the translation request based at least in part on the translation feedback rating.

19. The non-transitory computer storage of claim 15, wherein the one or more modules are further configured to:
select, from the translator data store, a second translator qualified to translate from the input language to the output language;
route the item to the second translator based at least in part on the selection; and
receive, by the computer system, a second translated item in the output language from the second translator.

20. The non-transitory computer storage of claim 19, wherein the one or more modules are further configured to:
compare, by the computing system, the content of the first translated item to a content of the second translated item;
determine a translation quality rating for each of the first translated item and the second translated item based at least in part on the comparing; and
select a preferred translated item from one of the first translated item and the second translated item, based at least in part on which of the respective translated items has a higher determined translation quality rating.

21. The non-transitory computer storage of claim 19, wherein the one or more modules are further configured to:
provide, to the user computing device, the first translated item and the second translated item;
receive, from the user computing device, a selection of the first translated item or the second translated item; and
facilitate a payment on behalf of the user to the first translator or the second translator based at least in part on the selection.

22. The non-transitory computer storage of claim 20, wherein to select a preferred translated item from one of the first translated item and the second translated item, the one or more modules are further configured to:
compare the first translated item, the second translated item, and the machine-translated item to each other;
determining a relative translation accuracy score for each of the first translated item, the second translated item, and the machine-translated item based at least in part on the comparison; and
selecting the first translated item in response to determining that the first translated item has a better relative translation accuracy score than the machine-translated item.

23. The non-transitory computer storage of claim 15, wherein the item comprises text, an image, audio, or video.

24. The non-transitory computer storage of claim 15, wherein the item is part of a communication between the user and a second user.

* * * * *